March 31, 1942.  E. V. BOREL  2,277,678
ELECTRIC FURNACE FOR MELTING GLASS
Original Filed Aug. 10, 1937
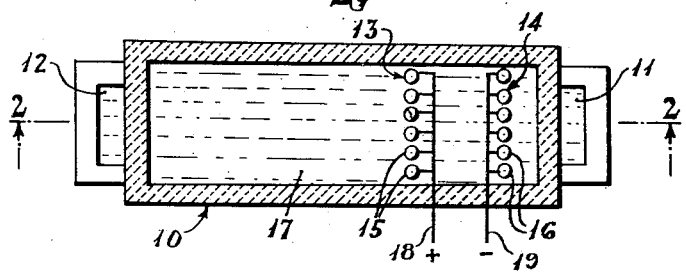
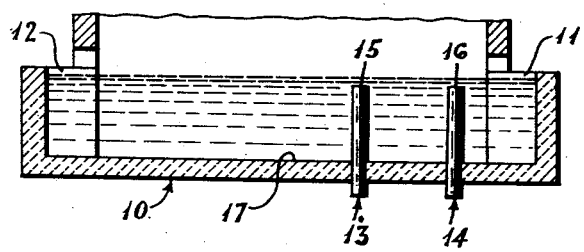
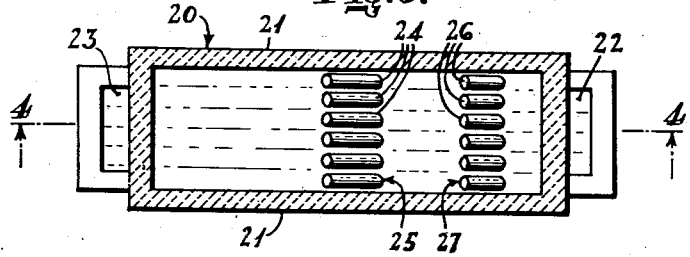
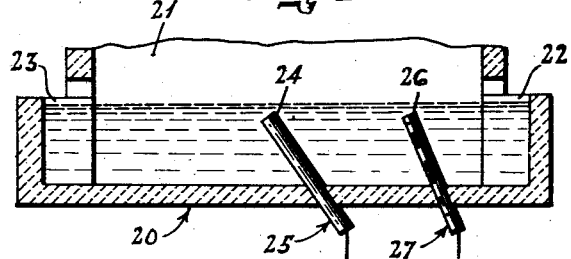
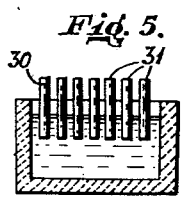
INVENTOR.
EDOUARD VIRGILE BOREL
BY
*Richards & Geier*
ATTORNEYS Patented Mar. 31, 1942

2,277,678

UNITED STATES PATENT OFFICE 2,277,678

ELECTRIC FURNACE FOR MELTING GLASS

Edouard Virgile Borel, Romont, Switzerland, assignor to Societe Anonyme des Manufactures des Glaces & Produits Chimiques de Saint-Gobain, Chauny & Cirey, Paris, France Original application August 10, 1937, Serial No. 158,347. Divided and this application May 6, 1940, Serial No. 333,567. In Germany August 14, 1936

13 Claims. (Cl. 13—6)

This invention relates to electric furnaces for making glass and refers more particularly to the heating of a glass mass in tank furnaces in which the material to be heated is supplied to one end of a tank furnace and finished glass is removed from the other end of the tank furnace, the glass mass being maintained at a substantially constant level within the tank furnace and flowing from one end thereof to the opposite end. The glass mass is heated within the tank furnace either totally or in part by an electrical current supplied by electrodes situated within the glass mass, the current flowing through the glass mass which acts as a resistance, so that it is heated by the Joule effect of the electrical current.

The present application is a division of my co-pending patent application Ser. No. 158,347 filed August 10, 1937 (now Patent No. 2,225,616) relating to an electric furnace for melting glass.

According to said co-pending application Ser. No. 158,347 in a tank furnace for the continuous manufacture of glass, wherein the raw materials are introduced at one end of the furnace and glass is removed at the opposite end of the furnace, the electrical current is supplied to the glass mass by means of electrodes, at least one of these electrodes being entirely immersed in and across the path of the glass flow so that the glass may flow above it, and extending substantially over the entire width of said glass flow. According to said invention heating zones are produced in the glass flow which extend transversely across the entire width of said flow.

The present invention has also for its object the provision of a tank furnace for the continuous manufacture of glass, the electrodes of which are so constructed that they allow the free passage of the glass mass flowing from one end of the furnace to its opposite end while providing high temperature zones extending transversely across the entire width of the flow.

The tank furnace according to the present invention comprises electrodes for supplying electrical current to the glass mass, at least one of these electrodes is constituted by a grid or row of parallel elements which are situated one next to the other, this grid being located in and across the glass flow and extending substantially over the entire width of said glass flow. Each of the elements of the grid occupies only a portion of the width of the glass flow and is located in a vertical longitudinal plane of the furnace distinct from those of the other elements. The number of said elements is such that they form a composite electrode acting substantially over the whole width of the glass flow but they are spaced from each other so that they leave passage to the flow of the glass through the plane of the electrode.

Said elements may be entirely or partially immersed in the glass mass and they may be placed vertically, horizontally or obliquely.

The elements of the same grid or row are connected to the same pole of a source of electrical energy.

Such composite electrodes may be used with other electrodes extending substantially over the entire width of the tank. In particular a plurality of such composite electrodes, connected to different poles of a source of electrical energy may be used in order to create in the space comprised between two of such composite electrodes a hot zone extending across the glass flow and substantially over its entire width.

In order to produce a more heated zone in the neighbourhood of such a composite electrode and of small extent longitudinally of the furnace, the elements may be of such forms and dimensions that the effective surface of contact of the composite electrode with the glass mass is smaller than the cross section—through a vertical plane perpendicular to the longitudinal axis of the furnace—of the glass mass between said electrode and another co-acting electrode so that the density of the electrical current is much greater in the neighbourhood of these elements than in parts of the glass mass which are more remote from said composite electrode. The elements are so spaced from each other that they do not hinder the flow of the glass mass through the tank, while the hot zones produced by the individual elements join each other to form a single hot zone which extends transversely to the direction of the flow of the glass mass and across the entire width of the tank.

The individual elements may extend horizontally, vertically or obliquely, and may be carried by the bottom or by the roof of the tank or supported by elements carried by the side walls of the tank furnace.

With electrodes constructed in accordance with the present invention the heat produced by the electrical current is concentrated in well defined zones which extend across the entire width of the furnace and which can have any desired form or location as far as the remaining portion of the glass mass is concerned. Consequently the entire glass mass moving through the furnace from the point of supply of the raw materials to the point of delivery of molten glass is caused to pass through these zones and to remain there for a predetermined period of time.

The invention will appear more clearly from the following detailed description when taken in connection with the accompanying drawing showing by way of example preferred embodiments of the inventive idea.

In the drawing:

Figure 1 is a horizontal section through a tank furnace according to the present invention.

Figure 2 is a vertical section along the line 2—2 of Figure 1.

Figure 3 is a horizontal section through a tank furnace provided with inclined electrodes; and Figure 4 is a section along the line 4—4 of Figure 3.

Figure 5 is a vertical cross section of a furnace showing another disposition of the composite electrode according to the present invention.

The tank furnace 10 shown in Figures 1 and 2 comprises an end 11 through which raw materials are introduced into the furnace and the end 12 from which finshed glass is removed. The electrodes 13 and 14 of this furnace consist of a plurality of vertical rod-like elements 15 and 16 arranged in rows extending across the entire width of the tank furnace.

The elements 15 are connected to one pole of a source of electrical energy and the elements 16 to the other pole.

Consequently the electrical current flows from one electrode to the other longitudinally of the furnace, i. e. in the direction of the glass flow. Thus a heating zone is created in the glass mass between these two electrodes and extends transversely of the furnace across the entire width of said furnace.

The elements 15 and 16 pass through openings provided in the bottom 17 of the tank furnace, although obviously, other means may be employed for maintaining the elements 15 and 16 in the required positions within the tank furnace. The elements of at least one of the composite electrode may be of such dimensions that the effective surface of contact of said composite electrode is smaller than the cross section of the glass mass through a vertical plane between the two electrodes. The surface of contact of at least one of the electrodes with the glass mass may be, for example, smaller than one-half the cross-sectional area of the current of glass flowing between the electrodes. Good results have been obtained with electrodes having a contact surface equal to one-third of the cross-sectional area of the current of glass. Thus the density of the electrical current will be greater in the neighbourhood of said elements and a hot zone will be produced around the elements of said composite electrode. The elements of said electrode are situated relatively close one to the other so that the hot zone produced around each element will join the hot zones of the neighbouring elements forming a single hot zone which extends across the entire width of the tank furnace and transversely to the direction of flow of the glass mass. At the same time, the elements of each electrode are spaced at sufficient distances from one another to enable the glass mass and particularly the upper layers to pass between the elements in the course of its flow from the end 11 toward the end 12 of the tank furnace.

The tank furnace 20 shown in Figures 3 and 4 comprises side walls 21, an opening 22 through which the raw materials are introduced, and a delivery end 23. The elements 24 of the electrode 25 and the elements 26 of the electrode 27 extend in rows across the entire width of the tank furnace and are inclined at any suitable angle in relation to the level of the glass mass situated within the tank furnace. Preferably the elements of each electrode extend parallel to each other. These elements thus form rows which extend across the width of the tank and the hot zones of which are directed transversely to the flow of the glass mass.

In Figure 5 is shown a composite electrode 30 comprising parallel vertical elements 31 which are not entirely immersed in the glass mass. The height of the part of said elements 31 which is immersed in the glass mass may be regulated at will. In particular with such a composite electrode it is possible to create a hot zone extending across the entire width of the furnace and located near the upper surface of the glass mass. The parts of the elements 31 which are situated above the glass mass may be protected by sheaths of refractory materials.

It is apparent that the specific illustrations shown above have been given by way of illustration and not by way of limitation, and that the structures above described are subject to wide variations and modifications without departing from the scope or intent of the invention. All of such variations and modifications are to be included within the scope of the present invention.

What is claimed is:

1. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of electrodes to supply electrical current to the glass mass, at least one of said electrodes consisting of a plurality of parallel elements situated closely one to the other in a row which extends into and across the path of the glass flow and extends substantially over the entire width of the tank while leaving passage to the flow of the glass through the plane of the electrode, each of said elements being located in a vertical longitudinal plane of the furnace, distinct from that of the other elements.

2. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of at least one pair of electrodes for heating the glass mass by the passage of an electrical current therethrough, at least one of said electrodes being located in and across the glass flow, acting substantially over the entire width of said glass flow and consisting of a grid of parallel elements, each of said elements extending in a vertical longitudinal plane of the furnace and occupying only a portion of the entire width of the flow of the glass mass, said elements being situated one next to the other to permit the flow of the glass mass therebetween, the contact surface of said grid with the glass mass being smaller than the vertical cross-section area of the glass mass between the electrodes, whereby the density of the electrical current is greater in a zone close to said electrode than in the zone between the electrodes, and said elements being spaced so as to produce a single hot zone extending across the entire width of the flow of the glass mass.

3. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of at least one pair of electrodes for heating the glass mass by the passage of an electrical current therethrough, at least one of said electrodes comprising a plurality of parallel rod-like elements, each of said elements extending in a vertical longitudinal plane of the furnace through openings formed in the bottom of the tank and said elements being situated closely one to the other in a row or grid which extends in and across the path of the glass flow and acts substantially over the entire width of the tank while leaving passage to the flow of the glass mass through the plane of the electrode.

4. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of at least one pair of electrodes for heating the glass mass by the passage of an electrical current therethrough, at least one of said electrodes comprising a plurality of parallel rod-like elements, each of said elements projecting into the glass mass in a vertical longitudinal plane of the furnace and extending above the glass mass and said elements being situated closely one to the other in a row or grid which extends in and across the path of the glass flow and acts substantially over the entire width of the tank while leaving passage to the flow of the glass mass through the plane of the electrode.

5. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of at least one pair of electrodes for heating the glass mass by the passage of an electrical current therethrough, at least one of said electrodes comprising a plurality of vertical rod-like elements situated closely one to the other in a row or grid which extends in and across the path of the glass flow and acts substantially over the entire width of the tank, while leaving passage to the flow of the glass mass through the plane of the electrode.

6. In a tank furnace for treating glass, wherein a fluid mass of glass in different states of chemical composition is maintained at a substantially constant level, the materials to be treated being introduced at one end of the tank and glass in the finished state being removed from the opposite end of the tank, the combination therewith of at least one pair of electrodes for heating the glass mass by the passage of an electrical current therethrough, at least one of said electrodes comprising a plurality of parallel obliquely inclined rod-like elements situated closely one to the other in a row or grid which extends in and across the path of the glass flow and acts substantially over the entire width of the tank while leaving passage to the flow of the glass mass through the plane of the electrode.

7. In glass making apparatus wherein a fluid mass to be treated flows from one end of a furnace to the other, at least two electrodes in said furnace, a source of electrical energy, and means connecting said electrodes to said source whereby electrical current is caused to flow through said mass between said electrodes, at least one of said electrodes being constituted by a plurality of elongated conducting elements spaced from each other and arranged close together in a row which extends transversely of the furnace into the flow path of said mass and across substantially the entire width of the furnace, all of said elements being connected to the same terminal of said source of electrical energy and positioned so that the longitudinal center lines thereof have vertical components.

8. In glass making apparatus wherein a fluid mass to be treated flows from one end of a furnace to the other, at least two electrodes in said furnace, a source of electrical energy, and means connecting said electrodes to said source whereby electrical current is caused to flow through said mass between said electrodes, at least one of said electrodes being constituted by a grid comprising a plurality of elongated elements, the longitudinal axes of which have vertical components in vertical planes extending longitudinally of the furnace, said grid extending transversely of the furnace into the flow path of said mass and across substantially the entire width thereof, all of the elements of said grid being connected to the same terminal of said source of electrical energy.

9. In glass making apparatus wherein the glass mass flows from one end of a furnace to the other, the materials to be treated being introduced adjacent one end of the furnace and glass being removed from adjacent the opposite end of the furnace, a plurality of electrodes, a source of electrical energy, and means connecting said electrodes to said source whereby electrical current is caused to flow through said mass between said electrodes, at least one of said electrodes being constituted by a grid comprising a plurality of elongated conducting elements, the longitudinal axes of which have vertical components and are in planes parallel to planes containing the longitudinal axis of the furnace, said grid extending transversely of the furnace across substantially the entire width thereof, all of the elements of said grid being connected to the same terminal of said source of electrical energy.

10. In a glass making furnace wherein the treated mass flows from one end of the furnace to the other, a plurality of electrodes, a source of electrical energy, and means connecting said electrodes to said source whereby electrical current is caused to flow through said mass between said electrodes, at least one of said electrodes being constituted by a grid comprising a plurality of rod-like elements, the longitudinal center line of each of said elements having a vertical component in the flow path of said mass and said grid extending transversely of the furnace across substantially the entire width thereof, all of the elements of said grid being connected to the same terminal of said source of electrical energy.

11. In a glass making furnace wherein the flow of the treated materials is from one end of the furnace to the other, a plurality of electrodes in said furnace, a source of electrical energy, and means connecting said electrodes to said source whereby electrical current is caused to flow through said materials between said electrodes, at least one of said electrodes comprising a plurality of rod-like elements the longitudinal axes of which have vertical components, said elements being situated close to one another to form a grid which extends into and across the path of the flow of said materials and acts substantially over the entire width of the furnace without stopping the flow of the glass mass therethrough.

12. In glass making apparatus wherein a fluid mass to be treated flows from one end of a furnace to the other, means for heating and controlling the flow of said mass through said furnace, said means including a source of electrical energy, a plurality of elongated electrical conductors in said furnace, and means for operatively connecting said conductors to said source of electrical energy, said conductors being arranged close together to form a grid which extends transversely of the furnace into the flow path of said mass and across substantially the entire width of the furnace, the longitudinal axis of each of said conductors having a vertical component.

13. In glass making apparatus, a container having an inlet adjacent one end thereof for the insertion of glass making materials and an outlet adjacent the other end thereof for the removal of glass, and means for controlling the flow of the glass mass from one end of said container to the other including a plurality of elongated elements in said container, said elements being arranged close to one another in the form of a grid which extends transversely of the container into the flow path of said mass and across substantially the entire width of the container between said inlet and said outlet and said elements being positioned so that the longitudinal center lines thereof have vertical components in said mass.

EDOUARD VIRGILE BOREL.